United States Patent
Mears

(10) Patent No.: US 9,794,258 B1
(45) Date of Patent: Oct. 17, 2017

(54) TECHNIQUES FOR MANAGING AUTHORIZATION

(71) Applicant: Symantec Corporation, Mountain View, CA (US)

(72) Inventor: John Mears, Abingdon (GB)

(73) Assignee: Symantec Corporation, Mountain View, CA (US)

( * ) Notice: Subject to any disclaimer, the term of this patent is extended or adjusted under 35 U.S.C. 154(b) by 56 days.

(21) Appl. No.: 14/529,363

(22) Filed: Oct. 31, 2014

(51) Int. Cl.
*H04L 29/06* (2006.01)

(52) U.S. Cl.
CPC .............. *H04L 63/10* (2013.01); *H04L 63/08* (2013.01)

(58) Field of Classification Search
CPC .................................. H04L 63/10; H04L 63/08
See application file for complete search history.

(56) References Cited

U.S. PATENT DOCUMENTS

| | | | | |
|---|---|---|---|---|
| 5,291,598 A * | 3/1994 | Grundy | ................. | G06F 21/10 726/28 |
| 6,047,268 A * | 4/2000 | Bartoli | ................. | G06Q 20/02 705/35 |
| 2005/0044154 A1* | 2/2005 | Kaminski | ............... | H04L 51/12 709/206 |
| 2005/0289027 A1* | 12/2005 | Buarque De Macedo | ............. | G06F 17/3056 705/31 |
| 2009/0187980 A1* | 7/2009 | Tung | ..................... | H04W 12/06 726/6 |
| 2013/0254848 A1* | 9/2013 | Ge | ......................... | G06F 21/335 726/4 |

OTHER PUBLICATIONS

Trostle, Jonathan T., and B. Clifford Neuman. "A flexible distributed authorization protocol." Network and Distributed System Security, 1996., Proceedings of the Symposium on. IEEE, 1996.*

* cited by examiner

*Primary Examiner* — Shawnchoy Rahman
(74) *Attorney, Agent, or Firm* — Wilmer Cutler Pickering Hale and Dorr LLP

(57) ABSTRACT

Techniques for managing authorization are disclosed. In one embodiment, the techniques may be realized as a method including receiving, from a centralized authorization service, authorization logic for an application; determining the identity of a user; and, based on the identity of the user, authorizing the use of a particular feature of the application using the received authorization logic.

20 Claims, 5 Drawing Sheets

400

| | Sender | Recipient | Subject | Date | Size |
|---|---|---|---|---|---|
| | Release  Delete  Delete All | | | | |
| 402a | ☐ example1@spam.com | user1@example.com | Hello | 10/20/14 | 13415 |
| 402b | ☐ example2@spam.com | user1@example.com | Pills to buy | 10/21/14 | 12114 |
| 402c | ☐ example1@spam.com | user2@example.com | *not displayed* | 10/18/14 | 22510 |
| 402d | ☐ example2@spam.com | user2@example.com | *not displayed* | 10/19/14 | 4821 |
| 402e | ☐ example3@spam.com | user3@example.com | *not displayed* | 10/20/14 | 212 |
| | Release  Delete  Delete All | | | | |
| | 404a    404b     404c | | | | |

Fig. 4

TECHNIQUES FOR MANAGING AUTHORIZATION

FIELD OF THE DISCLOSURE

The present disclosure relates generally to authorizing users and/or applications and, more particularly, to techniques for managing authorization.

BACKGROUND OF THE DISCLOSURE

An administrator will typically assign roles or capabilities to users and groups of users, depending on their roles and responsibilities within an organization. For example, an end user may be able to access documents and data related to themselves, and edit their own settings. A group administrator may have further capabilities such as the ability to view and change users' settings, but not read their documents. A company level admin may have those capabilities across multiple groups and applications. In special situations such as discovery, special temporary roles may need to be created to provide specific access for a period of time to certain people. Selective control of access to particular features within a system by particular users is called "authorization," which is separate from but related to the process of verifying the identity of credentialed users ("authentication").

The administrator will prefer to manage these things from a single central point for all applications, rather than separately for each application. Therefore, all the above needs to apply across multiple applications and services, and across locations such as different clients sites. It also needs to apply between different service form factors: cloud services, on-premises solutions, and hybrids.

There is therefore a need for a shared granular authorization service that can be used with multiple applications, locations, and service form factors.

A naive solution to this problem would involve a centralized authorization service which responds to authorization requests from multiple applications and sites. However, if this is used for granular authorization, it introduces many round trips to the shared authorization service, resulting in unacceptable latency and delays.

SUMMARY OF THE DISCLOSURE

Techniques for managing authorization are disclosed. In one embodiment, the techniques may be realized as a method comprising the steps of receiving, from a centralized authorization service, authorization logic for an application; determining the identity of a user; and based on the identity of the user, authorizing the use of a particular feature of the application using the received authorization logic.

In accordance with other aspects of this embodiment, the authorization logic can be executable code. The use of the particular feature can be authorized based on executing the code using the identity of the user as a parameter.

In accordance with further aspects of this embodiment, the code can be executed in an isolated environment. The code can be JavaScript.

In accordance with other aspects of this embodiment, the authorization logic can be signed by the central authorization service and validated prior to its use in authorization.

In accordance with other aspects of this embodiment, determining the identity of the user can include submitting one or more user credentials to a central authentication service.

In accordance with further aspects of this embodiment, determining the identity of the user can further include receiving and validating an authentication token signed by the central authentication service.

In accordance with another embodiment, the techniques may be realized as an article of manufacture including at least one processor readable storage medium and instructions stored on the at least one medium. The instructions may be configured to be readable from the at least one medium by at least one processor and thereby cause the at least one processor to operate so as to carry out any and all of the steps in the above-described method.

In accordance with another embodiment, the techniques may be realized as a system comprising one or more processors communicatively coupled to a network; wherein the one or more processors are configured to carry out any and all of the steps described with respect to any of the above embodiments.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

FIG. 4 shows an illustrated screenshot of an exemplary user interface in accordance with an embodiment of the present disclosure.

DETAILED DESCRIPTION OF EMBODIMENTS

A shared authorization service provides to a consuming application the logic necessary to locally evaluate the authorization associated with that application and delegates to the application control over the authorization of its features. This eliminates most of the latency associated with a centralized authorization service by, once the appropriate logic is transferred from the central service, performing authorization locally.

Figure 1:
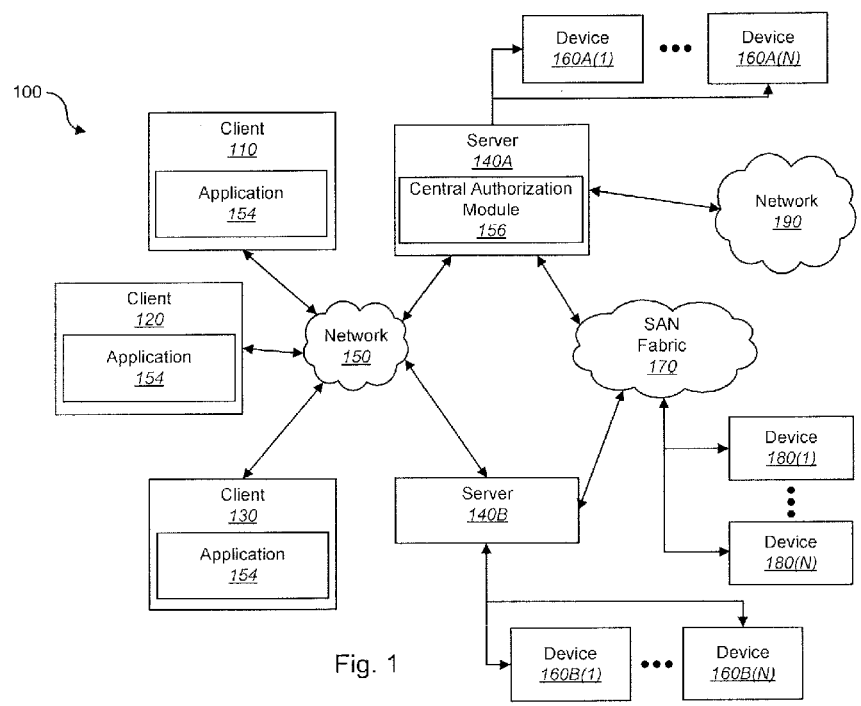
FIG. 1 shows a block diagram depicting a network architecture in accordance with an embodiment of the present disclosure.

FIG. 1 shows a block diagram depicting a network architecture 100 in accordance with an embodiment of the present disclosure. FIG. 1 is a simplified view of network architecture 100, which may include additional elements that are not depicted. Network architecture 100 may contain client systems 110, 120 and 130, as well as servers 140A-140N (one or more of each of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
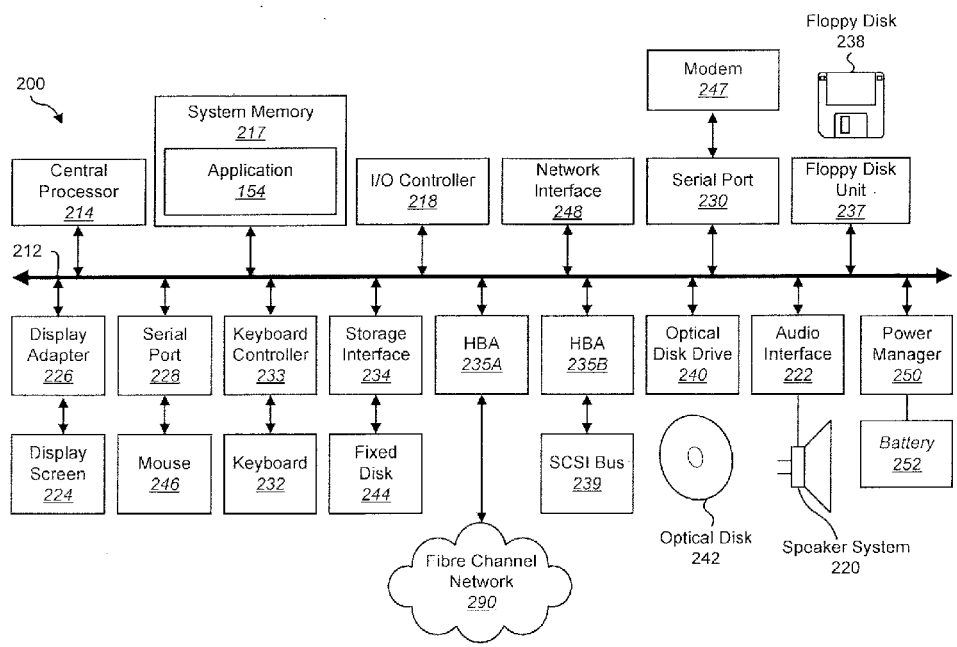
FIG. 2 shows a block diagram depicting a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes. Further, storage devices 160A(1)-(N), 160B(1)-(N), and/or 180(1)-(N) may be implemented as part of a multi-tier storage environment.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface. In some implementations, clients 110, 120, and 130 may specifically be network-capable mobile devices such as smartphones or tablets.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and 130 may contain one or more portions of software for implementation of secure applications such as, for example, application 154, while server 140A may include one or more portions such as, for example, central authorization module 156. Further, one or more portions of the application 154 may reside at a network centric location. For example, server 140A may be a server, a firewall, a gateway, or other network element that may perform one or more actions to support management of system and network security elements. According to some embodiments, network 190 may be an external network (e.g., the Internet) and server 140A may be a gateway or firewall between one or more internal components and clients and the external network. According to some embodiments, analysis and approval of resource references including data classifier 154 may be implemented as part of a cloud computing environment.

FIG. 2 shows a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, a removable disk unit (e.g., Universal Serial Bus drive), or other storage medium. According to some embodiments, application 154 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
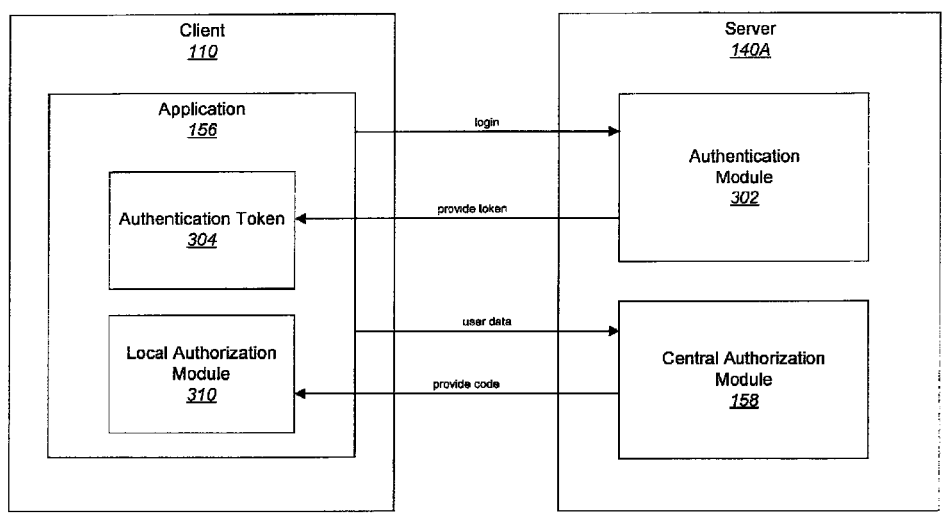
FIG. 3 shows a block diagram illustrating a method for local authorization in accordance with an embodiment of the present disclosure.

In one embodiment, the application 154 may be configured to communicate with the central authorization module 156 in addition to an authentication module 302 as illustrated in FIG. 3. Although both the central authorization module 156 and authentication module 302 are shown as hosted on the same server 140A, it will be understood that each can exist in any centralized location accessible to client systems.

As illustrated in FIG. 3, the application 156 may perform an authorization step in which a user's login information is sent to an authentication module 302. Data representing authentication of the user, such as an authentication token 304, may be received from the authentication module 302 in response. In some implementations, the authentication token 304 may provide user data necessary to supply to the central authorization module 158 for controlling access of particular features of the application 156. Authentication may also be performed without sending login information to the authentication module 302. For example, the user may be presented with a web page hosted by the authentication module for inputting credentials. Other methods of authentication known in the art will be recognized as compatible with some implementations of the system.

As illustrated, the central authorization module 158 conveys logic to the application 156 in the form of a local authorization module 310. The local authorization module 310 includes code to allow further authorization control to be conducted by consulting the local authorization module 310 and without consulting the central authorization module 158. That is, the user data and any initial data supplied by the central authorization module 158 is sufficient to allow decisions as to whether or not certain features are accessible by the user to be made by the application 156, using the local authorization module 310.

Different implementations of the system may or may not require data to be conveyed to the central authorization module 158 before it conveys a local authorization module 310. In one implementation, the local authorization module 310 may be provided to an application 156 on request without requiring any particular data ahead of time.

FIG. 4 is an exemplary screenshot of a user interface 400 which includes limited access in accordance with the present disclosure. As shown, the user interface 400 includes a list of email entries 402*a-e* which have been quarantined as spam. Buttons 404*a-c* are provided to allow a user to release selected entries from quarantine or to delete them.

The user interface 400 shows some of the authorization limitations of the user viewing the interface 400. For example, the user is only showed the subject of the first two emails 402*a* and 402*b*; the subject lines of the remaining three emails 40*c-e* are not displayed. Furthermore, hyperlinks are provided to certain sender addresses but not others. These differences in display amongst the different entries 402*a-e* illustrate differences in access authorized for the user viewing the entries.

Additionally, the user's ability to release or delete the emails may be similarly restricted. Although the interface allows the user to select any entry and release or delete it, or to delete all of the entries at once, upon attempting to perform these functions a display may inform the user that the user is not authorized to release or delete particular selected emails. The particular authorization for these activities may be retrieved by a local authorization module in response issuing an instruction through the interface as described herein.

Figure 5:
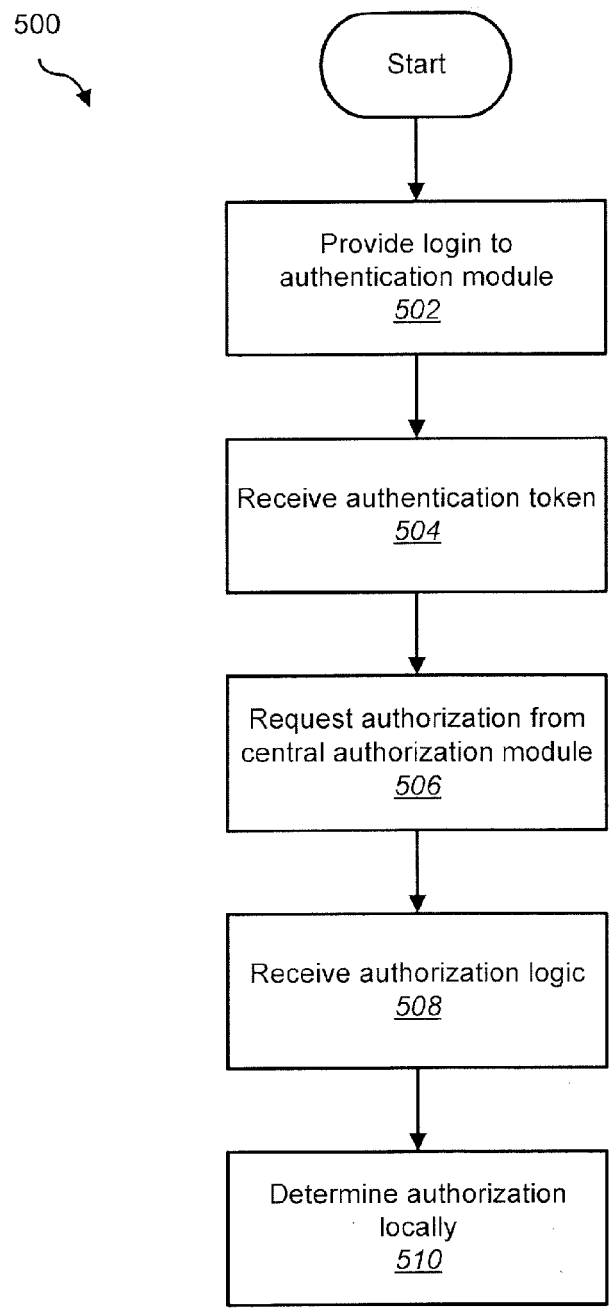
FIG. 5 shows a method for controlling authorization in accordance with an embodiment of the present disclosure.

FIG. 5 illustrates a method 500 for local authorization. An application running on a client system submits a user's login information or other credentials to a centralized authentication service (502) and receives an authentication token or other data identifying the user in response (504). In some implementations, security may be provided along with the authentication token, such as having the centralized authentication service sign the token. Other security measures, like requiring that the connection between the client system and the server hosting the centralized authentication is a secure connection, may also be taken.

The application also requests authorization from a central authorization service (506), which as described above may be hosted on the same or a different central location from the authentication service. In some implementations, the authorization service may only respond to queries which include a valid authentication token or other proof of identification. In some implementations, the central authorization service may respond to requests for authorization by returning one or more specific permissions in response to specific queries, which may allow the user to perform a one-time task such as accessing a particular file or database.

In order to localize further need for authorization, the central authorization service sends authorization logic to the application (508). This authorization logic may come in a number of forms which allow the application to resolve further authorization tasks without querying the central service again. For example, the logic may be in the form of executable code, such as JavaScript. The logic generated by the service may take into account the identity of the user or may use the user's credentials in making further evaluations of the user's permissions with respect to different application features. The central service may sign the code or take other security precautions to make sure that the communication is secure and genuine.

In some implementations, the client may request and receive authorization logic prior to authentication of the user or even when no authentication of the user is supplied. The identity of the user may be provided to the central authorization service even in the absence of the authentication, and this can be sufficient for the service to return authorization logic for the identified user. It will therefore be understood that even though authentication steps may be involved in implementations of the invention as described with respect to the method 500 depicted in FIG. 5, the system may still operate with fewer or no authentication steps.

Using the authorization logic, the application determines authorization locally, without querying the central authorization module again (510). Where the authorization logic is executable code, the code may be executed in a secure environment so as to reduce the possibility of injection or other malicious attacks. For example, where the code is JavaScript, programs exist to run suspect JavaScript executable code without providing full system access to the executable, thus minimizing risk of harm. Other security precautions may also be taken.

At this point it should be noted that techniques for managing authorization in accordance with the present disclosure as described above may involve the processing of input data and the generation of output data to some extent. This input data processing and output data generation may be implemented in hardware or software. For example, specific electronic components may be employed in an authentication module, central authorization module, local authorization module, or similar or related circuitry for implementing the functions associated with managing authorization in accordance with the present disclosure as described above. Alternatively, one or more processors operating in accordance with instructions may implement the functions associated with managing authorization in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A computer-implemented method comprising:
receiving, from a centralized authorization service, authorization logic for an application, wherein the authorization logic comprises executable code;
determining an identity of a user; and
based on the identity of the user, without further consulting the centralized authorization service, authorizing the use of a particular feature of the application using the received authorization logic, wherein the particular feature comprises allowing the user to release an email from quarantine, and wherein if the user is not authorized for a second feature, the second feature comprises at least one of displaying a subject of the email or providing a hyperlink of a sender address of the email.

2. The computer-implemented method of claim 1,
wherein the authorization logic is executable code; and
wherein the use of the particular feature is authorized based on executing the code.

3. The computer-implemented method of claim 2, wherein the code is executed in a secure computing environment.

4. The computer-implemented method of claim 2, wherein the code is JavaScript.

5. The computer-implemented method of claim 1, wherein the authorization logic is digitally signed by the central authorization service and validated prior to its use in authorization.

6. The computer-implemented method of claim 1, wherein determining the identity of the user comprises submitting one or more user credentials to a central authentication service.

7. The computer-implemented method of claim 6, wherein determining the identity of the user further comprises receiving and validating an authentication token signed by the central authentication service.

8. At least one non-transitory processor readable storage medium storing a computer program of instructions configured to be readable by at least one processor for instructing the at least one processor to execute a computer process for performing the method as recited in claim 1.

9. An article of manufacture comprising:
at least one non-transitory computer readable storage medium; and
instructions stored on the at least one medium;
wherein the instructions are configured to be readable from the at least one medium by at least one processor and thereby cause the at least one processor to operate so as to:
receive, from a centralized authorization service, authorization logic for an application, wherein the authorization logic comprises executable code;
determine an identity of a user; and
based on the identity of the user, without further consulting the centralized authorization service, authorize the use of a particular feature of the application using the received authorization logic, wherein the particular feature comprises allowing the user to release an email from quarantine, and wherein if the user is not authorized for a second feature, the second feature comprises at least one of displaying a subject of the email or providing a hyperlink of a sender address of the email.

10. The article of claim 9,
wherein the authorization logic is executable code; and
wherein the use of the particular feature is authorized based on executing the code.

11. The article of claim 10, wherein the code is executed in a secure computing environment.

12. The article of claim 10, wherein the code is JavaScript.

13. The article of claim 9, wherein the authorization logic is digitally signed by the central authorization service and validated prior to its use in authorization.

14. The article of claim 9, wherein determining the identity of the user comprises submitting one or more user credentials to a central authentication service.

15. The article of claim 14, wherein determining the identity of the user further comprises receiving and validating an authentication token signed by the central authentication service.

16. A system comprising:
one or more processors communicatively coupled to a network; wherein the one or more processors are configured to:
receive, from a centralized authorization service, authorization logic for an application, wherein the authorization logic comprises executable code;
determine an identity of a user; and
based on the identity of the user, without further consulting the centralized authorization service, authorize the use of a particular feature of the application using the received authorization logic, wherein the particular feature comprises allowing the user to release an email from quarantine, and wherein if the user is not authorized for a second feature, the second feature comprises at least one of displaying a subject of the email or providing a hyperlink of a sender address of the email.

17. The system of claim 16,
wherein the authorization logic is executable code; and
wherein the use of the particular feature is authorized based on executing the code.

18. The system of claim 17, wherein the code is executed in a secure computing environment.

19. The system of claim 16, wherein the authorization logic is digitally signed by the central authorization service and validated prior to its use in authorization.

20. The system of claim 16, wherein determining the identity of the user comprises submitting one or more user credentials to a central authentication service.

* * * * *